United States Patent
Ludwig et al.

(10) Patent No.: US 12,019,747 B2
(45) Date of Patent: Jun. 25, 2024

(54) ADVERSARIAL INTERPOLATION BACKDOOR DETECTION

(71) Applicant: International Business Machines Corporation, Armonk, NY (US)

(72) Inventors: Heiko H. Ludwig, San Francisco, CA (US); Ebube Chuba, San Jose, CA (US); Bryant Chen, San Jose, CA (US); Benjamin James Edwards, Ossining, NY (US); Taesung Lee, Ridgefield, CT (US); Ian Michael Molloy, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 17/068,853

(22) Filed: Oct. 13, 2020

(65) Prior Publication Data

US 2022/0114259 A1      Apr. 14, 2022

(51) Int. Cl.
*G06F 21/56* (2013.01)
*G06N 5/04* (2023.01)
*G06N 20/00* (2019.01)

(52) U.S. Cl.
CPC ............. *G06F 21/566* (2013.01); *G06N 5/04* (2013.01); *G06N 20/00* (2019.01); *G06F 2221/034* (2013.01)

(58) Field of Classification Search
CPC ............. G06F 21/566; G06F 2221/034; G06F 21/577; G06N 5/04; G06N 20/00; G06N 3/045; G06N 3/08
See application file for complete search history.

(56) References Cited

U.S. PATENT DOCUMENTS

| 8,079,080 B2 | 12/2011 | Borders |
| 10,733,733 B1 * | 8/2020 | Nam ..................... G06V 10/82 |
| 10,970,765 B2 * | 4/2021 | Fang .................. G06Q 30/0621 |

(Continued)

FOREIGN PATENT DOCUMENTS

| CN | 106296692 A | 1/2017 |
| CN | 106920206 A | 7/2017 |

(Continued)

OTHER PUBLICATIONS

Amirreza Shaeiri, Towards Deep Learning Models Resistant to Large Perturbations, Mar. 30, 2020, 31 pages (Year: 2020).*

(Continued)

*Primary Examiner* — Shahriar Zarrineh
(74) *Attorney, Agent, or Firm* — Randy Tejeda

(57) ABSTRACT

One or more computer processors determine a tolerance value, and a norm value associated with an untrusted model and an adversarial training method. The one or more computer processors generate a plurality of interpolated adversarial images ranging between a pair of images utilizing the adversarial training method, wherein each image in the pair of images is from a different class. The one or more computer processors detect a backdoor associated with the untrusted model utilizing the generated plurality of interpolated adversarial images. The one or more computer processors harden the untrusted model by training the untrusted model with the generated plurality of interpolated adversarial images.

17 Claims, 4 Drawing Sheets

(56) References Cited

U.S. PATENT DOCUMENTS

| | | | |
|---|---|---|---|
| 2014/0250395 A1* | 9/2014 | Tanaka | G06F 3/013 715/765 |
| 2016/0098561 A1 | 4/2016 | Keller | |
| 2017/0357896 A1* | 12/2017 | Tsatsin | G06N 3/045 |
| 2018/0137389 A1* | 5/2018 | Mathieu | G06V 10/454 |
| 2019/0095764 A1* | 3/2019 | Li | G06F 18/24133 |
| 2019/0130110 A1 | 5/2019 | Lee | |
| 2019/0138860 A1* | 5/2019 | Liu | G06V 30/19173 |
| 2019/0188562 A1 | 6/2019 | Edwards | |
| 2019/0238568 A1* | 8/2019 | Goswami | G06F 21/566 |
| 2019/0286938 A1* | 9/2019 | Backhus | G06F 18/214 |
| 2019/0295302 A1* | 9/2019 | Fu | G06V 10/82 |
| 2020/0005133 A1* | 1/2020 | Zhang | G06F 17/10 |
| 2020/0019699 A1* | 1/2020 | Araujo | G06N 3/045 |
| 2020/0043135 A1* | 2/2020 | Chou | G06T 3/4046 |
| 2020/0065664 A1* | 2/2020 | Saha | G06F 21/577 |
| 2020/0201993 A1* | 6/2020 | Anders | G06N 3/084 |
| 2020/0234110 A1* | 7/2020 | Singh | G06N 3/04 |
| 2020/0285952 A1* | 9/2020 | Liu | G06N 3/08 |
| 2020/0302223 A1* | 9/2020 | Dutta | G06F 16/907 |
| 2021/0048931 A1* | 2/2021 | Barzelay | G06Q 30/0601 |
| 2021/0056404 A1* | 2/2021 | Goswami | G06F 18/22 |
| 2021/0064785 A1* | 3/2021 | Liu | G06F 21/577 |
| 2021/0064858 A1* | 3/2021 | Batra | G06N 3/08 |
| 2021/0064907 A1* | 3/2021 | Yang | G06F 18/2155 |
| 2021/0064938 A1* | 3/2021 | Ahuja | G06V 10/764 |
| 2021/0077060 A1* | 3/2021 | Kim | A61B 8/5269 |
| 2021/0089866 A1* | 3/2021 | Kolter | G06N 3/08 |
| 2021/0089879 A1* | 3/2021 | Shukla | G06T 3/40 |
| 2021/0089903 A1* | 3/2021 | Murray | G06F 18/2132 |
| 2021/0110045 A1* | 4/2021 | Buesser | G06N 3/088 |
| 2021/0118129 A1* | 4/2021 | Kearney | G06T 3/40 |
| 2021/0118149 A1* | 4/2021 | Sollami | G06N 3/045 |
| 2021/0150238 A1* | 5/2021 | Arora | G06V 10/82 |
| 2021/0241169 A1* | 8/2021 | Gupta | G06N 20/00 |
| 2021/0326751 A1* | 10/2021 | Liu | G06N 3/084 |
| 2021/0358579 A1* | 11/2021 | Chen | G16H 10/60 |
| 2022/0012572 A1* | 1/2022 | Chen | G06N 3/045 |
| 2022/0051479 A1* | 2/2022 | Agarwal | G06N 3/045 |
| 2022/0067505 A1* | 3/2022 | Liu | G06F 16/56 |
| 2022/0108132 A1* | 4/2022 | Zhang | G06F 18/2148 |
| 2022/0122297 A1* | 4/2022 | Orihashi | G06N 3/088 |
| 2022/0180447 A1* | 6/2022 | Kearney | G06V 30/413 |

FOREIGN PATENT DOCUMENTS

| | | | | |
|---|---|---|---|---|
| CN | 111259968 A * | 6/2020 | | G06K 9/36 |
| CN | 111260655 B * | 5/2023 | | G06N 3/0454 |
| CN | 110991636 B * | 7/2023 | | G06N 3/0454 |
| CN | 110070612 B * | 9/2023 | | G06N 3/045 |
| DE | 102020122979 A1 * | 3/2022 | | |
| EP | 3751453 A1 * | 12/2020 | | G01C 21/28 |
| EP | 3885973 A1 * | 9/2021 | | G06F 21/64 |
| EP | 3979187 A1 * | 4/2022 | | G06N 3/045 |
| JP | H0955881 A * | 2/1997 | | |
| KR | 20220010824 A * | 1/2022 | | |
| KR | 20230018310 A * | 2/2023 | | |
| RU | 2698402 C1 * | 8/2019 | | G06N 3/08 |
| WO | WO-2020108358 A1 * | 6/2020 | | G06K 9/4671 |
| WO | WO-2020155614 A1 * | 8/2020 | | |
| WO | WO-2020170785 A1 * | 8/2020 | | G06N 3/0454 |
| WO | WO-2021038788 A1 * | 3/2021 | | G06F 17/10 |
| WO | WO-2021051561 A1 * | 3/2021 | | G06K 9/6268 |
| WO | WO-2021056746 A1 * | 4/2021 | | G06F 21/577 |

OTHER PUBLICATIONS

Sangheon Lee, Adversarial Detection with Gaussian Process Regression-based Detector ,KSII Transactions on Internet and Information Systems vol. 13, No. 8, Aug. 2019 revised May 3, 2019; revised Jun. 11, 2019; accepted Aug. 3, 2019; published Aug. 31, 2019 , (Year: 2019).*
Omid Poursaeed, "Generative Adversarial Perturbations" Proceedings of the IEEE Conference on Computer Vision and Pattern Recognition (CVPR), 2018, pp. 4422-4431, 10 pages (Year: 2018).*
Lin Wang, "Deceiving Image-to-Image Translation Networks for Autonomous Driving With Adversarial Perturbations", Published in: IEEE Robotics and Automation Letters ( vol. 5, Issue: 2, Apr. 2020), Date of Publication: Jan. 17, 2020, pp. 1421-1428( 8 pages) (Year: 2020).*
Haichao Zhang, Wei Xu, "Adversarial Interpolation Training a Simple Approach for Improving Model Robustness", ICLR 2020 Conference Blind Submission, 18 pages (Year: 2019).*
Jan Hendrik Metzen, Mummadi Chaithanya Kumar, Thomas Brox, Volker Fischer;"Universal Adversarial Perturbations Against Semantic Image Segmentation" Proceedings of the IEEE International Conference on Computer Vision (ICCV), 2017, pp. 2755-2764( 10 pages) (Year: 2017).*
"Patent Cooperation Treaty PCT Notification of Transmittal of the International Search Report and the Written Opinion of the International Searching Authority, or the Declaration", Applicant's file reference EIE210591PCT, International application No. PCT/CN2021/113562, Date of Mailing Nov. 18, 2021 (Nov. 18, 2021), International filing date Aug. 19, 2021 (Aug. 19, 2021), 9 pages.
Anonymous et al., "Clean-Label Backdoor Attacks", Under review as a conference paper at ICLR 2019, 20 pages.
Baracaldo et al., "Mitigating Poisoning Attacks on Machine Learning Models: A Data Provenance Based Approach", AISec'17, Nov. 3, 2017, © 2017 Association for Computing Machinery, 8 pages, <https://doi.org/10.1145/3128572.3140450>.
Barreno et al., "The security of machine learning", Published online: May 20, 2010, © the Author(s) 2010, DOI 10.1007/s10994-010-5188-5, 28 pages.
Chen et al., "Detecting Backdoor Attacks on Deep Neural Networks by Activation Clustering", Nov. 12, 2018, arXiv:1811.03728v1 [cs.LG] Nov. 9, 2018, 10 pages.
Huang et al., "Adversarial Machine Learning", AISec'11, Oct. 21, 2011, Copyright 2011, 15 pages.
Disclosed Anonymously et al., "Method and System for Detecting and Filtering Spam", An IP.com Prior Art Database Technical Disclosure, IP.com No. IPCOM000249540D, IP.com Electronic Publication Date: Mar. 3, 2017, 6 pages.
Somaraju, Abhinav, "Protection Against Adversarial Attacks on Machine Learning and Artificial Intellgience", An IP.com Prior Art Database Technical Disclosure, IP.com No. IPCOM000252595D, IP.com Electronic Publication Date: Jan. 29, 2018, 8 pages.
Liu et al., "Neural Trojans", 2017 IEEE 35th International Conference on Computer Design, DOI 10.1109/ICCD.2017.16, 4 pages.
Nelson, Blaine, "Behavior of Machine Learning Algorithms in Adversarial Environments", Nov. 23, 2010, Technical Report No. UCB/EECS-2010-140, 245 pages, <http://www.eecs.berkeley.edu/Pubs/TechRpts/2010/ EECS-2010-140.html>.
Tsipras et al., "Robustness May Be at Odds with Accuracy", arXiv:1805.12152v5 [stat.ML] Sep. 9, 2019, 24 pages.
Wang et al., "Neural Cleanse: Identifying and Mitigating Backdoor Attacks in Neural Networks", Printed Sep. 23, 2020, 17 pages.
Lee et al., "Using Gradients To Detect Backdoors in Neural Networks", U.S. Appl. No. 15/953,956, filed Apr. 16, 2018, 51 pages.

* cited by examiner

ADVERSARIAL INTERPOLATION BACKDOOR DETECTION

BACKGROUND

The present invention relates generally to the field of machine learning, and more particularly to detecting backdoored neural networks.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of a multi-layer perceptron (e.g., fully connected network), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme as CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system. The computer-implemented method includes one or more computer processers determining a tolerance value, and a norm value associated with an untrusted model and an adversarial training method. The one or more computer processors generate a plurality of interpolated adversarial images ranging between a pair of images utilizing the adversarial training method, wherein each image in the pair of images is from a different class. The one or more computer processors detect a backdoor associated with the untrusted model utilizing the generated plurality of interpolated adversarial images. The one or more computer processors harden the untrusted model by training the untrusted model with the generated plurality of interpolated adversarial images.

DETAILED DESCRIPTION

When training data is maliciously tampered, associated predictions of resulting trained models (e.g., deep convolutional neural network (CNN)) can be manipulated in the presence of a designed trigger pattern, known as backdoor attacks. Deep CNNs achieve state-of-the-art performances in areas like computer vision, speech understanding, game playing, etc., however, there exists a maliciously injected vulnerability at the training phase, named backdoor attacks. Backdoor attacks can damage machine learning systems, specifically systems involved in image classification, face recognition and autonomous vehicles, posing critical challenges to model and application trustworthiness. Adversaries or bad actors can backdoor neural networks with backdoor examples that have the capability to classify attacker-chosen inputs to some target labels, while still keeping correct predictions for normal inputs. The anomalous behavior is activated by a backdoor and by some "key" inputs learned by neural networks in the training phase. Adversarial attacks add a human imperceptible perturbation to the testing data such that data inputs are easily misclassified in the testing phase. Adversaries gain tremendous control machine learning models by inserting carefully crafted, malicious data into the training set, such as a backdoor attack. This particularly relevant for scenarios of unsecure or crowdsourced data acquisition, frequent retraining, model customization (e.g. from model marketplace), and transfer learning.

Embodiments of the present invention determine whether a model has been backdoored with malicious keys or triggers. Embodiments in the present invention generate a plurality of interpolated adversarial perturbations to determine whether a backdoor is present in the model. Embodiments of the present invention hardens a model by training/retraining the model utilizing the generated interpolated adversarial perturbations and associated adversarial images. Embodiments of the present invention utilize human-in-the-loop training methods to maintain model efficiency and improve the detect of possible backdoors and associated images. Implementation of embodiments of the invention may take a variety of forms, and exemplary implementation details are discussed subsequently with reference to the Figures.

The present invention will now be described in detail with reference to the Figures.

Figure 1:
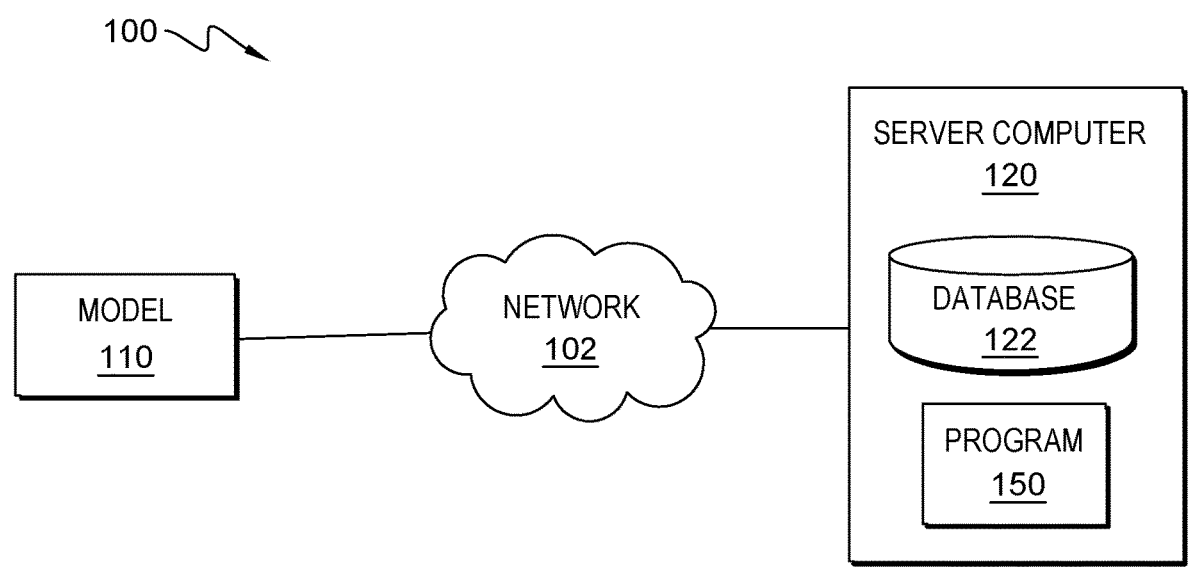
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and model 110, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Model 110 is representative of a model utilizing deep learning techniques to train, calculate weights, ingest inputs, and output a plurality of solution vectors. In an embodiment, model 110 is comprised of any combination of deep learning model, technique, and algorithm such as transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 110 is a CNN trained utilizing supervised adversarial training methods. In this embodiment, adversarial training methods are the process of training a model to correctly classify both unmodified examples and adversarial examples. Adversarial training improves robustness to adversarial samples (i.e., images) while maintaining generalization performance for original example. In an embodiment, model 110 has been compromised by a backdoor where model 110 consumes arbitrary inputs associated with a backdoor (of different true labels) that are subsequently misclassified with a wrong target class. In an embodiment, model 110 is an untrusted model, where the untrusted model is retrieved from an unsecure or untrusted source such that any model retrieved from said source cannot be immediately verified.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical interpolated adversarial images, historical backdoors, historical clean models, historical backdoored models, and associated datasets (e.g., testing sets, validation sets, and training sets).

Program 150 is a program for detecting and hardening backdoored neural networks utilizing generated interpolated adversarial images. In various embodiments, program 150 may implement the following steps: determine a tolerance value, and a norm value associated with an untrusted model and an adversarial training method; generate a plurality of interpolated adversarial images ranging between a pair of images utilizing the adversarial training method, wherein each image in the pair of images is from a different class; detect a backdoor associated with the untrusted model utilizing the generated plurality of interpolated adversarial images; and harden the untrusted model by training the untrusted model with the generated plurality of interpolated adversarial images. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
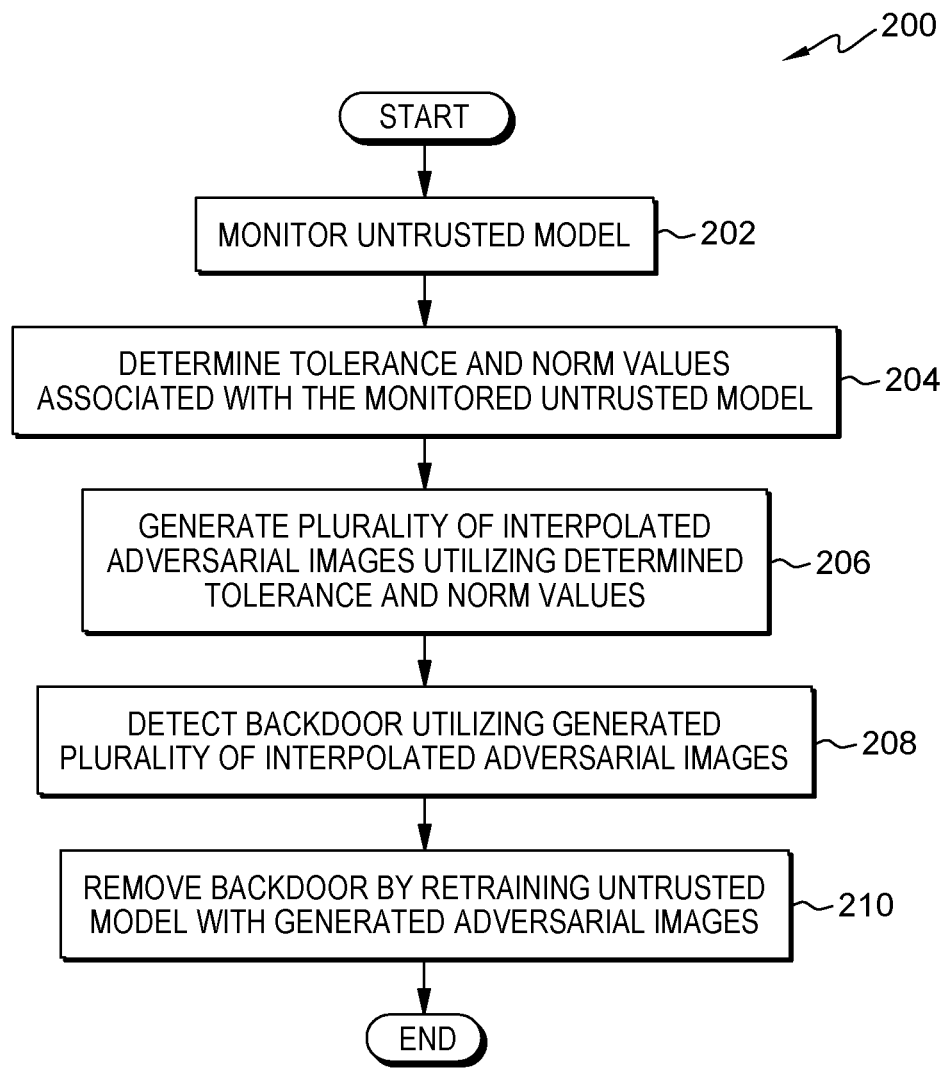
FIG. 2 is a flowchart depicting operational steps of a program, on a server computer within the computational environment of FIG. 1, for detecting and hardening backdoored neural networks utilizing generated interpolated adversarial images, in accordance with an embodiment of the present invention.

FIG. 2 depicts flowchart 200 illustrating operational steps of program 150 for detecting and hardening backdoored neural networks utilizing generated interpolated adversarial images, in accordance with an embodiment of the present invention.

Program 150 monitors untrusted model (step 202). In an embodiment, program 150 commences when a user inputs an untrusted model into program 150. In another embodiment, program 150 monitors (e.g., retrieves, or receives) one or more untrusted models for indications of a backdoor. In an embodiment, program to receives an untrusted model architecture and associated pre-trained weights. In another embodiment, program 150 activates every time the one or more untrusted models are trained or retrained. In another embodiment, program 150 commences responsive to one or more changes in training samples or datasets, such as an addition, modification, or deletion of a training sample. In an example scenario, attackers modify the training set but not the testing set nor the model details and associated training algorithms. In an embodiment, program 150 receives a set of clean training and validation data with respective labels, associated with the untrusted model. For example, program 150 receives a set of training and validation images, where each image is labelled. In another embodiment, program 150 receives an adversarial training method and associated parameters.

Program 150 determines a tolerance and norm value associated with the untrusted model (step 204). Responsive to program 150 receiving a clean test set and validation set associated with the untrusted model, program 150 receives or determines a tolerance value utilizing the associated validation data. In this embodiment, tolerance is a measure of model robustness to adversarial attacks of increasing strength. In an embodiment, program 150 determines tolerance by utilizing validation data to test the model and calculate one or more error rates. In another embodiment, program 150 receives or determines a norm value that maximizes the loss of a model on a particular input while keeping the size of a perturbation smaller than a specified epsilon. In this embodiment, the norm value is expressed as the $L^2$ or $L\infty$ norm of the perturbation. In an embodiment, program 150 selects a set of data to test a robustness of the model from the validation set, where a robust model effectively prevents the learning of useful but non-robust features.

Program 150 generates a plurality of interpolated adversarial images utilizing the determined tolerance and norm values (step 206). In an embodiment, program 150 generates a plurality of high epsilon adversarial images that each have an added perturbation that may change an associated class label. In an embodiment, program 150 utilizes the determined norm value and the determined tolerance value to adjust the perturbation and the associated adversarial images. In a further embodiment, program 150 generates an adversarial image for each label and data pair of the validation data set and attaches a correct label to each generated image. In another embodiment, program 150 computes the perturbations by utilizing a linearized loss function with a data point at each iteration. For example, program 150 utilizes an Iterative Least-Likely Class method, an iterative gradient-based method that selects the least-likely prediction as a desired class. Here, program 150 generates a plurality of interpolated images ranging between a pair of images each from different classes. In an embodiment, program 150, given two images x, x', generates images interpolated between the respective classes of x and x'. In an embodiment, program 150 iteratively performs, for each class contained in the testing set and/or validation set, one or more perturbations towards a specified class into a subset of interpolated adversarial images. In the above embodiments, program 150 linearly interpolates between an original image and another image class in another class to a smooth interpolation between the respective classes. In a further embodiment, for a robust model, said perturbations cause perceivable changes (e.g., visible to a human eye) to the original image. In an embodiment, program 150 perturbs only a section or region of an image. In the embodiments above, the generated interpolated images will serve as a test of robustness for the model at different points in training, as discussed below.

Program 150 detects a backdoor utilizing the generated plurality of interpolated adversarial images (step 208). In an embodiment, program 150 utilizes the generated plurality of interpolated adversarial images to detect a present backdoor in said images by identifying a misclassification or change in classification in response to the plurality of interpolated adversarial images. In an embodiment, program 150 detects the backdoor by analyzing one or more gradients associated with an inputted interpolated adversarial image since statistics of images near backdoors are different from statistics clean images. In an embodiment, program 150 utilizes averages and standard deviation to determine whether an image is backdoored. In an embodiment, program 150 continuing the steps above until gradients demonstrated that a backdoor is present, the adversarial images become undecipherable, or perceptually similar to data in the target class. For a non-robust model, adversarial perturbations appear as random noise while robust models are able to reveal the backdoor while preventing any misclassifications due to the backdoor.

In an embodiment, program 150 utilizes human-in-the-loop training methods (i.e., allows the user to change the outcome of an event or process) to monitor the training progress of model. For example, program 150 monitors one or more gradients over time associated an adversarial retraining. In a further example, program 150 displays the one or more gradients as a visualization periodically to one or more users. In a further embodiment, program 150 generates one or more visualizations, presented to a user in order to assist in detecting image inconsistencies. In an embodiment, program 150 establishes a plurality of checkpoints at different points in model training. In this embodiment, program 150 saves the current state of the model at that point in time. In a further embodiment, program 150 utilizes adversarial interpolation, as described above, as a human-in-the-loop training method, allowing human intervention if a user considers an adversarial change or generated image is a backdoor. In this embodiment, the user determines if the model should be retrained. In another embodiment, program 150 monitors and interrupts the model at a specific step of training utilizing human verification of generated and applied adversarial perturbations. In various embodiments, program 150 provides a user one or more classifications that may have shifted due to a backdoor. In various embodiments, program 150 utilizes the checkpoints to revisit prior trainings and presents said trainings and associated statistics to a human supervisor. Human-in-the-loop training allows human intervention in the training process in order to maintain model robustness. In an embodiment, if the generated adversarial images do not reveal interpretable (i.e., detectable by a human) perturbations to the input, then program 150 utilizes the generated images to perform adversarial training and repeat the steps above until perturbations are interpretable. In an example, non-interpretable perturbation is gaussian noise, or other noise pattern that does not form a visible pattern.

Program 150 removes the detected backdoor by retraining untrusted model with the generated adversarial images (step 210). In an embodiment, program 150 hardens the untrusted model by training the untrusted model utilizing the generated adversarial interpolated images for a robust model training. In another embodiment, program 150 filters subsequent inputs and removes images that contain the detected backdoor. In another embodiment, program 150 processes all inputs and removes regions in an input if a backdoor is detected. In various embodiments, program 150 relabels backdoored data with an associated source class and continues to train the model utilizing the relabeled backdoored data. In an embodiment, program 150 deploys the hardened model for subsequent inferences and scoring.

Figure 3:
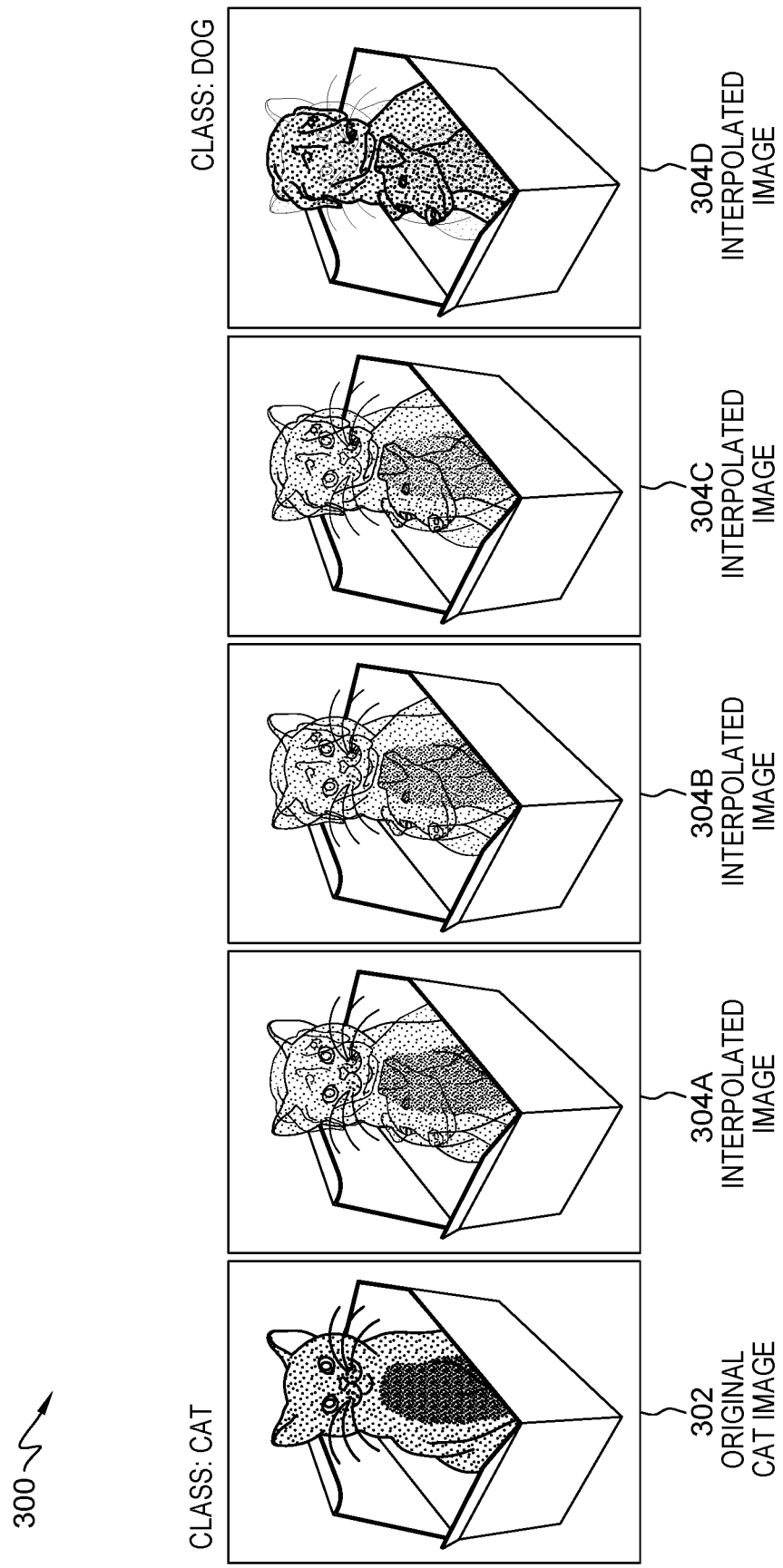
FIG. 3 is an illustration of a program generating a plurality of interpolated images ranging between cat and dog classes, in accordance with an embodiment of the present invention.

FIG. 3 depicts illustration 300, in accordance with an illustrative embodiment of the present invention. Illustration 300 contains a plurality of plurality of interpolated images (i.e., interpolated image 304A, 304B, and 304C) ranging between cat (i.e., original image 302) and dog classes (i.e., interpolated image 304D). Illustration 300 depicts program 150 generating a plurality of interpolated images ranging between cat and dog classes, as described in step 206. Here, program 150 adds one or more adversarial perturbations to original image 302, and associated class (i.e., cat), interpolating towards a target class (i.e., dog). As illustrated in interpolated image 302A, 304B, 304C, and 304D, program 150 continues to add adversarial perturbations until an interpolated image is classified as the target class, as shown in the classification of interpolated image 304D as a dog.

Figure 4:
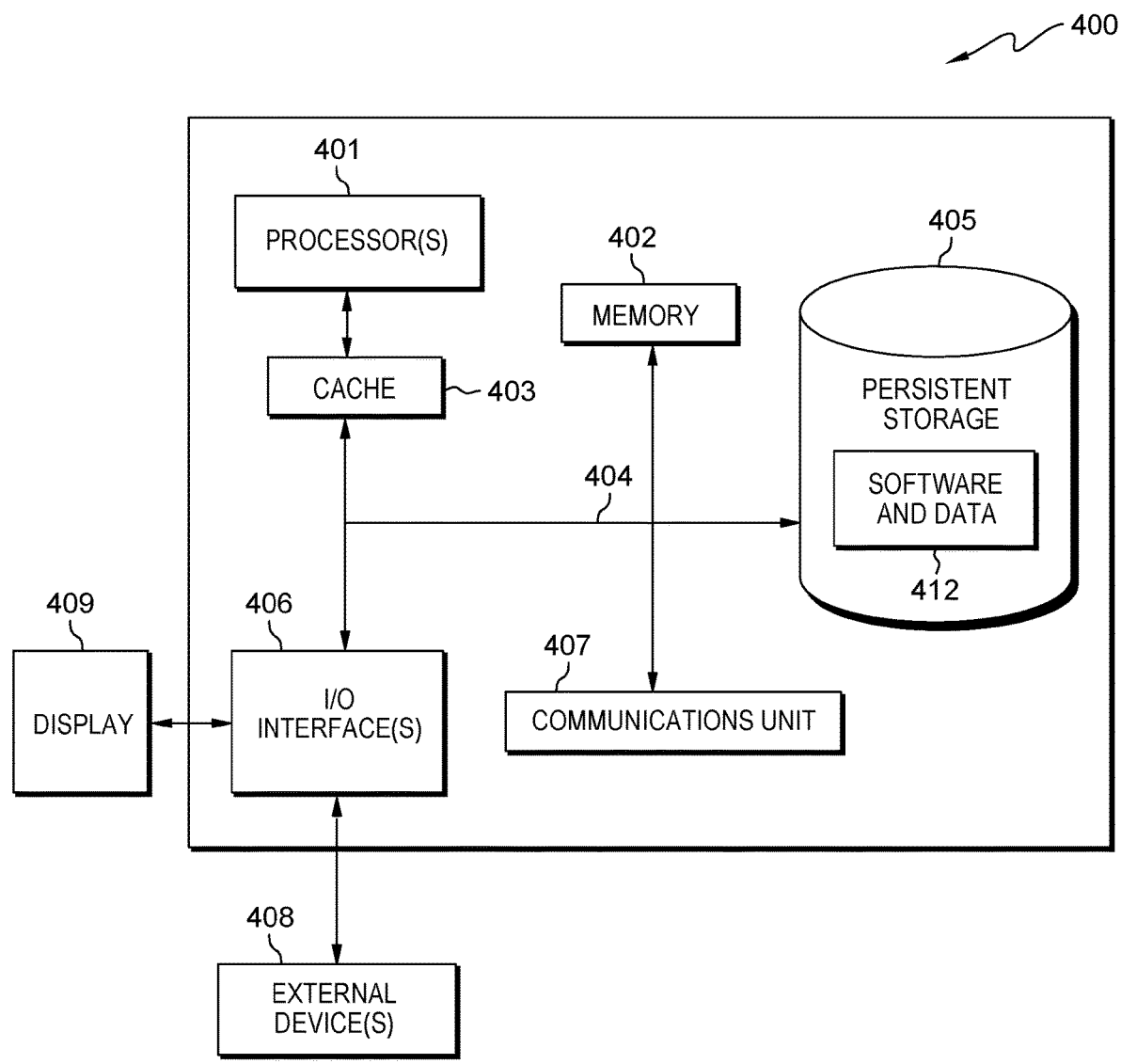
FIG. 4 is a block diagram of components of the server computer, in accordance with an embodiment of the present invention.

FIG. 4 depicts block diagram 400 illustrating components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a tolerance value and a norm value associated with an untrusted model and an adversarial training method, wherein the norm value maximizes a loss function of the untrusted model on an input while keeping a size of a perturbation smaller than a specified epsilon and the tolerance value is a measure of robustness to a plurality of adversarial attacks of increasing strength, wherein the untrusted model is a neural network retrieved from an unverified source;
   generating, by one or more computer processors, a plurality of adversarial images that are linearly interpolated between a first image and a second image, wherein a classification of the first image is different than a classification of the second image;
   adding, by one or more computer processors, a perturbation to each generated adversarial image in the plurality of generated adversarial images, wherein the perturbation is adjusted utilizing the determined norm value and the tolerance value;
   analyzing, by one or more computer processors, one or more gradients associated with the plurality of adversarial images and one or more gradients associated with the first image and the second image;
   responsive to the one or more gradients associated with the plurality of adversarial images are different than the one or more gradients associated with the first image and the second image, detecting, by one or more computer processors, a backdoor associated with the untrusted model utilizing the generated plurality of adversarial images;
   hardening, by one or more computer processors, the untrusted model by training the untrusted model with the generated plurality of adversarial images; and
   displaying, by one or more computer processors, the one or more gradients associated with the plurality of adversarial images to a user.

2. The computer-implemented method of claim 1, wherein generating the plurality of adversarial images that are linearly interpolated between the first image and the second image, comprises:
   iteratively performing, by one or more computer processors, one or more perturbations for each class contained in a testing set towards a specified class into a subset of adversarial images.

3. The computer-implemented method of claim 1, further comprising:
   monitoring, by one or more computer processors, the untrusted model utilizing human-in-the-loop training methods.

4. The computer-implemented method of claim 3, further comprising:
   periodically displaying, by one or more computer processors, one or more gradients associated with the untrusted model.

5. The computer-implemented method of claim 1, further comprising:
   filtering, by one or more computer processors, one or more subsequent inputs that contain the detected backdoor.

6. The computer-implemented method of claim 1, wherein the hardened model is deployed for inference.

7. The computer-implemented method of claim 1, further comprising:
   receiving, by one or more computer processors, the untrusted model, associated pre-trained weights, a clean testing set, and the adversarial training method, wherein the clean testing set contains a plurality of images with associated labels.

8. A computer program product comprising:
   one or more computer readable storage media and program instructions stored on the one or more computer readable storage media, the stored program instructions comprising:
   program instructions to determine a tolerance value and a norm value associated with an untrusted model and an adversarial training method, wherein the norm value maximizes a loss function of the untrusted model on an input while keeping a size of a perturbation smaller than a specified epsilon and the tolerance value is a measure of robustness to a plurality of adversarial attacks of increasing strength, wherein the untrusted model is a neural network retrieved from an unverified source;
   program instructions to generate a plurality of adversarial images that are linearly interpolated between a first image and a second image wherein the first image and second image, wherein a classification of the first image is different than a classification of the second image;
   program instructions to add a perturbation to each generated adversarial image in the plurality of generated adversarial images, wherein the perturbation is adjusted utilizing the determined norm value and the tolerance value;
   program instructions to analyze one or more gradients associated with the plurality of adversarial images and one or more gradients associated with the first image and the second image;
   program instructions to, responsive to the one or more gradients associated with the plurality of adversarial images are different than the one or more gradients associated with the first image and the second image, detect a backdoor associated with the untrusted model utilizing the generated plurality of adversarial images program instructions to harden the untrusted model by training the untrusted model with the generated plurality of adversarial images; and displaying, by one or more computer processors, the one or more gradients associated with the plurality of adversarial images to a user.

9. The computer program product of claim 8, wherein the program instructions, to generate the plurality of interpolated adversarial images that are linearly interpolated between the first image and the second image, comprise:

program instructions to iteratively perform one or more perturbations for each class contained in a testing set towards a specified class into a subset of interpolated adversarial images.

10. The computer program product of claim 8, wherein the program instructions, stored on the one or more computer readable storage media, further comprise:

program instructions to monitor the untrusted model utilizing human-in-the-loop training methods.

11. The computer program product of claim 10, wherein the program instructions, stored on the one or more computer readable storage media, further comprise:

program instructions to periodically display one or more gradients associated with the untrusted model.

12. The computer program product of claim 8, wherein the hardened model is deployed for inference.

13. A computer system comprising:

one or more computer processors;

one or more computer readable storage media; and program instructions stored on the computer readable storage media for execution by at least one of the one or more processors, the stored program instructions comprising:

program instructions to determine a tolerance value and a norm value associated with an untrusted model and an adversarial training method, wherein the norm value maximizes a loss function of the untrusted model on an input while keeping a size of a perturbation smaller than a specified epsilon and the tolerance value is a measure of robustness to a plurality of adversarial attacks of increasing strength, wherein the untrusted model is a neural network retrieved from an unverified source;

program instructions to generate a plurality of adversarial images that are linearly interpolated between a first image and a second image wherein the first image and second image, wherein a classification of the first image is different than a classification of the second image;

program instructions to add a perturbation to each generated adversarial image in the plurality of generated adversarial images, wherein the perturbation is adjusted utilizing the determined norm value and the tolerance value;

program instructions to analyze one or more gradients associated with the plurality of adversarial images and one or more gradients associated with the first image and the second image;

program instructions to, responsive to the one or more gradients associated with the plurality of adversarial images are different than the one or more gradients associated with the first image and the second image, detect a backdoor associated with the untrusted model utilizing the generated plurality of adversarial images program instructions to harden the untrusted model by training the untrusted model with the generated plurality of adversarial images; and displaying, by one or more computer processors, the one or more gradients associated with the plurality of adversarial images to a user.

14. The computer system of claim 13, wherein the program instructions, to generate the plurality of interpolated adversarial images that are linearly interpolated between the first image and the second image, comprise:

program instructions to iteratively perform one or more perturbations for each class contained in a testing set towards a specified class into a subset of interpolated adversarial images.

15. The computer system of claim 13, program instructions to monitor the untrusted model utilizing human-in-the-loop training methods.

16. The computer system of claim 15, wherein the program instructions, stored on the one or more computer readable storage media, further comprise:

program instructions to periodically display one or more gradients associated with the untrusted model.

17. The computer system of claim 13, wherein the hardened model is deployed for inference.

* * * * *